United States Patent
Oates

(10) Patent No.: US 9,853,574 B2
(45) Date of Patent: Dec. 26, 2017

(54) VOLTAGE SOURCE CONVERTER

(71) Applicant: General Electric Technology GmbH, Baden (CH)

(72) Inventor: Colin Donald Murray Oates, Staffordshire (GB)

(73) Assignee: GENERAL ELECTRIC TECHNOLOGY GMBH (CH)

( * ) Notice: Subject to any disclaimer, the term of this patent is extended or adjusted under 35 U.S.C. 154(b) by 0 days.

(21) Appl. No.: 15/030,012

(22) PCT Filed: Oct. 14, 2014

(86) PCT No.: PCT/EP2014/072062
§ 371 (c)(1),
(2) Date: Apr. 15, 2016

(87) PCT Pub. No.: WO2015/055682
PCT Pub. Date: Apr. 23, 2015

(65) Prior Publication Data
US 2016/0308466 A1    Oct. 20, 2016

(30) Foreign Application Priority Data
Oct. 16, 2013 (EP) ................... 13188974

(51) Int. Cl.
*H02M 7/797* (2006.01)
*H02M 1/12* (2006.01)
(Continued)

(52) U.S. Cl.
CPC ........... *H02M 7/797* (2013.01); *H02M 1/126* (2013.01); *H02M 2001/0003* (2013.01); *H02M 2001/0025* (2013.01); *H02M 2007/4835* (2013.01)

(58) Field of Classification Search
CPC . H02M 2001/0003; H02M 2001/0012; H02M 2001/0025; H02M 1/12; H02M 1/126; H02M 2007/4835; H02M 7/797
See application file for complete search history.

(56) References Cited

U.S. PATENT DOCUMENTS

2011/0222323 A1* 9/2011 Dofnas ................. H02M 7/483
                                                           363/71
2013/0148392 A1* 6/2013 Inoue ...................... H02M 7/10
                                                           363/68
(Continued)

FOREIGN PATENT DOCUMENTS

EP    2 602 927 A2    6/2013
WO   WO-2010/145705 A1   12/2010

OTHER PUBLICATIONS

Bifaretti, S. et al., "Advanced Power Electronic Conversion and Control System for Universal and Flexible Power Management," IEEE Transactions on Smart Grid, IEEE, vol. 2, No. 2, pp. 231-243 (Jun. 1, 2011).

(Continued)

*Primary Examiner* — Fred E Finch, III
(74) *Attorney, Agent, or Firm* — GE Global Patent Operation; Scott R. Stanley

(57) ABSTRACT

A voltage source converter including a DC terminal for connection to a DC electrical network, and a converter limb operatively connected to the DC terminal. The converter limb including at least one limb portion operatively connected to an AC terminal. The limb portion including a valve, the valve including at least one module, the module including at least one switching element and at least one energy storage device, the switching element and each energy storage device in the module combining to selectively provide a voltage source. A controller including a valve voltage demand sub-controller. The controller being (Continued)

configured to provide AC and DC output voltage demands to the valve voltage demand sub-controller. And, a switching control unit configured to control switching of the switching element in the module so as to generate a voltage across the valve.

13 Claims, 8 Drawing Sheets

(51) Int. Cl.
*H02M 1/00* (2006.01)
*H02M 7/483* (2007.01)

(56) References Cited

U.S. PATENT DOCUMENTS

| | | | |
|---|---|---|---|
| 2013/0208519 A1* | 8/2013 | Yamamoto | H02M 7/12 363/67 |
| 2014/0103887 A1* | 4/2014 | Akagi | H02J 3/1857 323/207 |
| 2014/0369096 A1* | 12/2014 | Hosokawa | H01F 30/04 363/68 |

OTHER PUBLICATIONS

International Search Report and Written Opinion, PCT/EP014/072062, ALSTOM Technology Ltd, 12 pages (dated Feb. 4, 2015).

Münch, P., et al., "Modeling and Current Control of Modular Multilevel Converters Considering Actuator and Sensor Delays," 35th Annual Conference of IEEE Industrial Electronics (IECON), pp. 1633-1638 (2009).

Akagi, H., et al., "PWM Control and Experiment of Modular Multilevel Converters," IEEE Power Electronics Specialists Conference, PESC2008, 8 pages (2008).

Soto-Sanchez, D., et al., "Control of a Modular Multilevel Converter-Based HVDC Transmission System," Proceedings of the 14th European Conference on Power Electronics and Applications (EPE2011), 10 pages (2011).

Blaabjerg, F., et al., "Overview of Control and Grid Synchronisation for Distributed Power Generation Systems," IEEE Transactions on Industrial Electronics, vol. 53, No. 5, pp. 1398-1409 (Oct. 2006).

Oates, C., "A Methodology for Developing 'Chainlinkl' Converters," 13th European Conference on Power Electronics and Applications, pp. 1-10 (Sep. 2009).

* cited by examiner

VOLTAGE SOURCE CONVERTER

CROSS-REFERENCE TO RELATED APPLICATIONS

The present application is a National Stage of International Application No. PCT/EP2014/072062, filed Oct. 14, 2014, which claims the benefit of and priority to European Application No. 13188974, filed Oct. 16, 2013, which is incorporated herein by reference in its entirety.

BACKGROUND

This invention relates to a voltage source converter, and a method of controlling a voltage source converter.

In power transmission networks alternating current (AC) power is typically converted to direct current (DC) power for transmission via overhead lines and/or under-sea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance.

The conversion of AC power to DC power is also utilized in power transmission networks where it is necessary to interconnect the AC electrical networks operating at different frequencies. In any such power transmission network, converters are required at each interface between AC and DC power to effect the required conversion, and one such form of converter is a voltage source converter (VSC).

BRIEF SUMMARY

According to a first aspect of the invention, there is provided a voltage source converter comprising:
 a DC terminal for connection to a DC electrical network;
 a converter limb operatively connected to the DC terminal, the converter limb including at least one limb portion operatively connected to an AC terminal, the AC terminal being connectable to an AC electrical network, the or each limb portion including a valve, the or each valve including at least one module, the or each module including at least one switching element and at least one energy storage device, the or each switching element and the or each energy storage device in the or each module combining to selectively provide a voltage source;
 a controller including a valve voltage demand sub-controller, the controller being configured to provide a zero alternating current demand and a direct current demand to the valve voltage demand sub-controller, the controller being further configured to provide AC and DC output voltage demands to the valve voltage demand sub-controller, the valve voltage demand sub-controller being configured to process the alternating and direct current demands and the AC and DC output voltage demands so as to generate a or a respective valve voltage demand for the or each valve; and
 a switching control unit configured to control switching of the or each switching element in the or each module so as to generate a voltage across the or each valve in accordance with the or the respective valve voltage demand and thereby cause transfer of power between the AC and DC electrical networks.

In use, the voltage source converter is operable to transfer power between the AC and DC electrical networks through switching of the or each switching element in the or each module so as to selectively operate the or each limb portion as a discrete controlled voltage source between the AC and DC terminals over an operating cycle of the voltage source converter. Operation of a limb portion as a discrete controlled voltage source between the corresponding AC and DC terminals enables the limb portion to be further operated to control the configuration of a voltage at the respective terminal. For example, the or each switching element in the or each module can be switched to selectively provide a voltage source to "push up" (add voltage steps to) and/or "pull down" (subtract voltage steps from) a DC voltage at the DC terminal to control the configuration of an AC voltage at the AC terminal. Switching of the or each switching element in the or each module is carried out in accordance with a or a respective valve voltage demand for the or each valve.

In order for the voltage source converter to exchange power with the AC and DC electrical networks and thereby cause transfer of power between the AC and DC electrical networks, the controller and switching control unit control the operation of the voltage source converter in accordance with AC and DC output voltage demands and alternating and direct current demands.

In use, the DC electrical network is operated within or up to a predefined rated DC voltage and the AC electrical network is operated within or up to a predefined rated AC voltage. The AC and DC output voltage demands for the voltage source converter respectively correspond to the AC voltage of the AC electrical network and the DC voltage of the DC electrical network.

For a given level of transfer of power between the voltage source converter and the AC electrical network, the provision of the AC output voltage demand by the controller enables control over an alternating current flowing between the voltage source converter and the AC electrical network. The controller may be configured in various ways to enable it to provide the AC output voltage demand. For example, the controller may include a vector control block configured to provide the AC output voltage demand.

During the transfer of power between the AC and DC electrical networks, both AC and DC power flow through at least one energy storage device of at least one module in the or each limb portion. This means that, in generating a or a respective valve voltage demand for the or each valve, the controller must take into account the AC and DC output voltage demands and the alternating and direct current demands. However, since the provision of the AC output voltage demand by the controller already enables control over an alternating current flowing between the voltage source converter and the AC electrical network, the controller must be configured to provide a zero alternating current demand to the valve voltage demand sub-controller to avoid duplication of control over the alternating current flowing between the voltage source converter and the AC electrical network. Otherwise the provision of a non-zero alternating current demand to the valve voltage demand sub-controller could interfere with the operation of the controller to reliably control the alternating current flowing between the voltage source converter and the AC electrical network.

The configuration of the controller to provide a zero alternating current demand to the valve voltage demand sub-controller therefore permits generation of a valve voltage demand that enables regulation of the direct current flowing between the voltage source converter and the DC electrical network, and inhibition of the flow of undesirable alternating current components in the voltage source converter, without inhibiting the operation of the controller to reliably control the alternating current flowing between the voltage source converter and the AC electrical network. In addition, the configuration of the controller enables the valve voltage demand sub-controller to operate as a deadbeat control that has minimal effect on the bandwidths of other components of the controller that are configured to provide the demands to the valve voltage demand sub-controller. This results in a more optimal and reliable controller for controlling the voltage source converter to transfer power between the AC and DC electrical networks.

The topology of the voltage source converter may vary depending on the requirements of the associated power application.

For example, the voltage source converter may include:
  first and second DC terminals for connection to a DC electrical network;
  a converter limb extending between the first and second DC terminals, the converter limb including first and second limb portions separated by an AC terminal, the AC terminal being connectable to an AC electrical network.

The number of converter limbs in the voltage source converter may vary depending on the number of phases of the AC electrical network. For example, the voltage source converter may include a plurality of converter limbs, the AC terminal of each converter limb being connectable to a respective phase of a multi-phase AC electrical network.

The direct current demand may be defined in various ways to enable generation of a or a respective valve voltage demand for the or each valve so as to fulfil different operating requirements of the voltage source converter, examples of which are described as follows.

During the operation of the voltage source converter to transfer power between the AC and DC electrical networks, energy is transferred from one of the AC and DC electrical networks to the other of the AC and DC electrical networks. Energy transferred from one of the AC and DC electrical networks to the other of the AC and DC electrical networks flows through the or each energy storage device of the or each module that is controlled to selectively provide a voltage source during the operation of the voltage source converter to transfer power between the AC and DC electrical networks. Such a flow of energy through the or each energy storage device of the or each module could result in energy accumulation in (or energy loss from) at least one energy storage device, thus resulting in deviation of the energy level of at least one energy storage device from a reference value.

In addition, whilst electrical transducers can be used to monitor the operation of the voltage source converter by providing feedback in the form of electrical measurements to allow any necessary adjustment of the operation of the voltage source converter, the tolerance of each electrical transducer, however small, could result in electrical measurement errors that in turn could cause the energy level of at least one energy storage device to deviate over time from a reference value.

Such a deviation is undesirable because, if too little energy is stored within a given energy storage device then the voltage the corresponding module is able to generate is reduced, whereas if too much energy is stored in a given energy storage device then over-voltage problems may arise. The former would require the addition of a power supply to restore the energy level of the affected energy storage device to the reference value, while the latter would require an increase in voltage rating of one or more energy storage devices to prevent the over-voltage problems, thus adding to the overall size, weight and cost of the voltage source converter.

In embodiments of the invention, the direct current demand may be defined to enable maintenance of an energy level of at least one energy storage device at a predefined energy level or within a predefined energy range, when the switching control unit controls switching of the or each switching element in the or each module so as to generate a voltage across the or each valve in accordance with the or the respective valve voltage demand.

The direct current demand may be readily defined through the steps of: observing a deviation in the energy level of the at least one energy storage device over time from the predefined energy level or the predefined energy range; and increasing or decreasing the direct current demand until the energy level of the at least one energy storage device reverts to the predefined energy level or the predefined energy range. For example, when the voltage source converter is operating as a rectifier and a net increase in the energy level of the at least one energy storage device is observed, insufficient energy is being provided to the DC electrical network and so the direct current demand is increased in order to cause the net charge in the energy level of the at least one energy storage device to revert to zero. Similarly, for example, when the voltage source converter is operating as an inverter and a net increase in the energy level of the at least one energy storage device is observed, too much energy is being extracted from the DC electrical network and so the direct current demand is decreased in order to cause the net charge in the energy level of the at least one energy storage device to revert to zero. These steps may be repeated several times, if necessary.

In further embodiments of the invention in which the converter limb includes a plurality of limb portions, the direct current demand may be defined to enable balancing of:
  an energy level of the energy storage device in one limb portion with an energy level of the energy storage device in another limb portion; or
  an average energy level of a plurality of energy storage devices in one limb portion with an average energy level of a plurality of energy storage devices in another limb portion,
  when the switching control unit controls switching of the or each switching element in each module so as to generate a voltage across the or each valve in accordance with the or the respective valve voltage demand.

The direct current demand may be readily defined through the steps of: observing an imbalance between the energy level of the energy storage device in one limb portion with an energy level of the energy storage device in another limb portion; or the average energy level of a plurality of energy storage devices in one limb portion with an average energy level of a plurality of energy storage devices in another limb portion, and increasing or decreasing the direct current demand until balance is restored. These steps may be repeated several times, if necessary.

In still further embodiments of the invention in which the converter limb includes a plurality of limb portions, the direct current demand may be defined to enable maintenance of a sum of energy levels or average energy levels of a plurality of energy storage devices in a plurality of limb portions at a predefined energy level or within a predefined energy range, when the switching control unit controls switching of the or each switching element in each module so as to generate a voltage across the or each valve in accordance with the or the respective valve voltage demand.

The direct current demand may be readily defined through the steps of: observing a deviation in the sum of energy levels or average energy levels of a plurality of energy storage devices in a plurality of limb portions from the predefined energy level or the predefined energy range, and increasing or decreasing the direct current demand until the sum of energy levels or average energy levels of a plurality of energy storage devices in a plurality of limb portions reverts to the predefined energy level or the predefined energy range. These steps may be repeated several times, if necessary.

Defining the direct current demand in any of the manners set out above permits regulation of the energy stored in a given energy storage device, thereby obviating the above-mentioned problems associated with a deviation of the energy level of at least one energy storage device from the reference value.

In addition such regulation of the energy stored in a given energy storage device allows the voltage of any particular energy storage device to be kept at an average value to simplify the control and improve the performance of a voltage source converter which uses the average value as feedback to control switching of the or each switching element of the or each module of the or each valve.

The valve voltage demand sub-controller may be configured in various ways to enable generation of a or a respective valve voltage demand for the or each valve so as to fulfil different operating requirements of the voltage source converter, examples of which are described as follows.

In embodiments of the invention, the voltage source converter may include a current measurement device configured to measure a or a respective limb portion current in the or each limb portion, the valve voltage demand sub-controller being further configured to process the or the measured limb portion current so as to generate a or a respective valve voltage demand for the or each valve.

The use of the or the respective limb portion current as feedback allows the valve voltage demand sub-controller to function as a feedback deadbeat control and thereby enhances control over the operation of the voltage source converter to transfer power between the AC and DC electrical networks while having minimal effect on the bandwidths of the other components of the controller that are configured to provide the demands to the valve voltage demand sub-controller.

In further embodiments of the invention, the controller may include:
  a first signal converter configured to convert a or a respective measured limb portion current into alternating and direct current terms;
  a current modifier configured to modify the alternating current term to remove an AC fundamental current term so as to generate a modified alternating current term; and
  a first signal comparison block configured to compare the direct current term with the direct current demand and to compare the modified alternating current term with the zero alternating current demand so as to generate alternating and direct current compensation signals, and wherein the valve voltage demand sub-controller may include:
  a second signal converter configured to convert the alternating and direct current compensation signals into AC and DC voltage terms;

a second signal comparison block configured to compare the DC voltage term with the DC output voltage demand and to compare the AC voltage term with the AC output voltage demand so as to generate AC and DC voltage compensation signals; and
  a third signal converter configured to convert the AC and DC voltage compensation signals into a or a respective valve voltage demand for the or each valve.

The voltage source converter may include a plurality of AC terminals, each AC terminal being connectable to a respective phase of a multi-phase AC electrical network, and such a voltage source converter may be connected to the AC electrical network via a star-delta transformer that includes mutually coupled star-shaped and delta-shaped windings. The lack of a neutral wire in a delta-shaped winding prevents zero phase sequence alternating current components from travelling into a neutral wire. This means that the zero phase sequence alternating current components become trapped in the closed loop formed by the delta-shaped winding and thus cannot enter the connected AC electrical network. However, the delta-shaped winding provides a current path in which uncontrolled zero phase sequence alternating current components can circulate between the different phases.

The current modifier may be further configured to modify the alternating current term so as to generate a modified alternating current term to restrict a circulating current from flowing within the converter limb. The modification of the alternating current term in this manner restricts circulation of uncontrolled currents within the converter limb.

The current modifier may include at least one filter configured to modify the alternating current term. The or each filter may be, for example, a low-pass filter (so as to allow any DC circulating current present in the voltage source converter to be controlled) or a high pass filter (so as to allow any super harmonics present in the voltage source converter to be controlled).

The third signal converter may be configured to process the AC and DC voltage compensation signals using a sum and difference function so as to convert AC and DC voltage compensation signals into a or a respective valve voltage demand for the or each valve.

The configuration of the valve voltage demand sub-controller in any of the manners set out above provides a reliable means of generating the or the respective valve voltage demand for the or each valve.

According to a second aspect of the invention, there is provided a method of controlling a voltage source converter, the voltage source converter comprising a DC terminal for connection to a DC electrical network, the voltage source converter further including a converter limb operatively connected to the DC terminal, the converter limb including at least one limb portion operatively connected to an AC terminal, the AC terminal being connectable to an AC electrical network, the or each limb portion including a valve, the or each valve including at least one module, the or each module including at least one switching element and at least one energy storage device, the or each switching element and the or each energy storage device in the or each module combining to selectively provide a voltage source, the method comprising the steps of:
  (a) providing a zero alternating current demand and a direct current demand;
  (b) providing AC and DC output voltage demands;
  (c) processing the alternating and direct current demands and the AC and DC output voltage demands so as to generate a or a respective valve voltage demand for the or each valve;

(d) switching the or each switching element in the or each module so as to generate a voltage across the or each valve in accordance with the or the respective valve voltage demand and thereby cause transfer of power between the AC and DC electrical networks.

The step of providing AC and DC output voltage demands may include the sub-step of using, for example, a vector control to provide the AC output voltage demand.

As mentioned earlier, the topology of the voltage source converter may vary depending on the requirements of the associated power application.

The step of providing a zero alternating current demand and a direct current demand may include the sub-step of providing a direct current demand that is defined to enable maintenance of an energy level of at least one energy storage device at a predefined energy level or within a predefined energy range, when the or each switching element in the or each module is switched so as to generate a voltage across the or each valve in accordance with the or the respective valve voltage demand.

When the converter limb includes a plurality of limb portions, the step of providing a zero alternating current demand and a direct current demand may include the sub-step of providing a direct current demand that is defined to enable balancing of:
  an energy level of the energy storage device in one limb portion with an energy level of the energy storage device in another limb portion; or
  an average energy level of a plurality of energy storage devices in one limb portion with an average energy level of a plurality of energy storage devices in another limb portion,
  when the or each switching element in each module is switched so as to generate a voltage across the or each valve in accordance with the or the respective valve voltage demand.

When the converter limb includes a plurality of limb portions, the step of providing a zero alternating current demand and a direct current demand may include the sub-step of providing a direct current demand that is defined to enable maintenance of a sum of energy levels or average energy levels of a plurality of energy storage devices in a plurality of limb portions at a predefined energy level or within a predefined energy range, when the or each switching element in each module is switched so as to generate a voltage across the or each valve in accordance with the or the respective valve voltage demand.

The step of processing the alternating and direct current demands and the AC and DC output voltage demands so as to generate a or a respective valve voltage demand for the or each valve may further include the sub-steps of measuring a or a respective limb portion current in the or each limb portion, and processing the or the respective limb portion current so as to generate a or a respective valve voltage demand for the or each valve The step of processing the alternating and direct current demands and the AC and DC output voltage demands so as to generate a or a respective valve voltage demand for the or each valve may further include the sub-steps of:
  (a) measuring a or a respective limb portion current in the or each limb portion;
  (b) converting the or measured limb portion current into alternating and direct current terms;
  (c) modifying the alternating current term to remove an AC fundamental current term so as to generate a modified alternating current term;
  (d) comparing the direct current term with the direct current demand and comparing the modified alternating current term with the zero alternating current demand so as to generate alternating and direct current compensation signals;
  (e) converting the alternating and direct current compensation signals into AC and DC voltage terms;
  (f) comparing the DC voltage term with the DC output voltage demand and comparing the AC voltage term with the AC output voltage demand so as to generate AC and DC voltage compensation signals;
  (g) converting the AC and DC voltage compensation signals into a or a respective valve voltage demand for the or each valve.

The step of modifying the alternating current term to remove an AC fundamental current term so as to generate a modified alternating current term may include the sub-step of modifying the alternating current term to remove at least one AC zero-phase sequence current term so as to generate the modified alternating current term.

The step of modifying the alternating current term to remove an AC fundamental current term so as to generate a modified alternating current term may include the sub-step of modifying the alternating current term using filtering. Such filtering may be, for example, high-pass filtering and/or low-pass filtering.

The step of converting AC and DC voltage compensation signals into a or a respective valve voltage demand for the or each valve may include the sub-step of processing the AC and DC voltage compensation signals sum and difference function so as to convert AC and DC voltage compensation signals into a or a respective valve voltage demand for the or each valve.

BRIEF DESCRIPTION OF THE DRAWINGS

A preferred embodiment of the invention will now be described, by way of a non-limiting example, with reference to the accompanying drawings in which:

FIG. 1b shows, in schematic form, a module of the voltage source converter of FIG. 1a;

FIG. 2 shows, in schematic form, a layout of a controller of the voltage source converter of FIG. 1a;

FIGS. 5 to 10 illustrates results of a model of the operation of the voltage source converter of FIG. 1a.

DETAILED DESCRIPTION

Figure 1A:
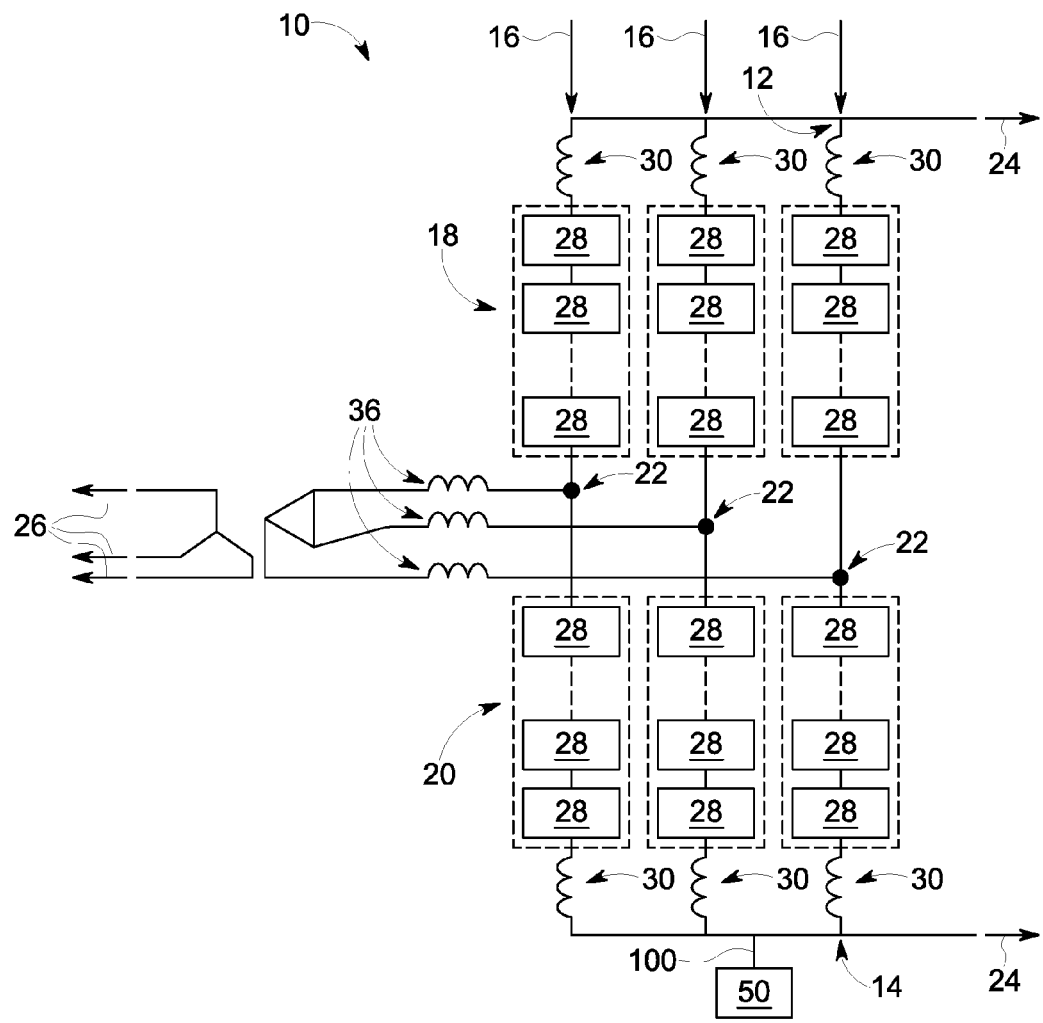
FIG. 1a shows, in schematic form, a voltage source converter according to an embodiment of the invention.

A voltage source converter 10 according to an embodiment of the invention is shown in FIG. 1a.

The voltage source converter 10 comprises first and second DC terminals 12,14 and three converter limbs 16. Each converter limb 16 extends between the first and second DC terminals 12,14. Each converter limb 16 includes first and second limb portions 18,20 separated by a respective AC terminal 22.

In use, the first and second DC terminals 12,14 are respectively connected to positive and negative poles of a DC electrical network 24, while each AC terminal 22 is connected to a respective phase of a three-phase AC electrical network 26. More particularly, in the case of the latter, the AC terminals 22 of the voltage source converter 10 are connected to the AC electrical network 26 via a star-delta transformer that includes mutually coupled star-connected and delta-connected windings. Each AC terminal 26 is connected to a respective corner of the delta-connected winding, and so the star-delta transformer presents a respective series reactance (which is shown as an inductor 36 in FIG. 1a) to each AC terminal 22.

Figure 1B:
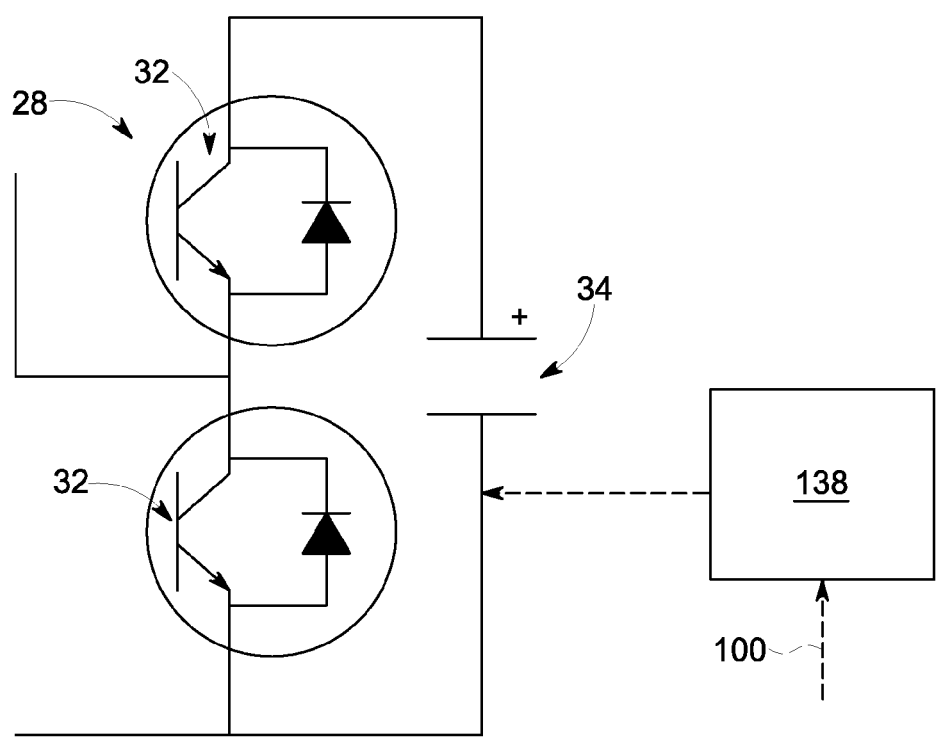

Each limb portion 18,20 includes a plurality of series-connected modules 28 connected in series with a limb inductor 30. Each module 28 includes a pair of active switching elements 32 and an energy storage device in the form of a capacitor 34. The pair of active switching elements 32 is connected in parallel with the capacitor 34 in a half-bridge arrangement, as shown in FIG. 1b.

Each active switching element 32 constitutes an insulated gate bipolar transistor (IGBT), which is connected in parallel with an anti-parallel passive current check element in the form of a diode. It is envisaged that, in other embodiments of the invention, each active switching element may be replaced by a plurality of active switching elements, e.g. a plurality of series-connected active switching elements. It is further envisaged that, in other embodiments of the invention, each IGBT may be replaced by another type of active switching element, for example, a metal-oxide-semiconductor field-effect transistor, a gate turn-off thyristor or an integrated gate-commutated thyristor.

It is envisaged that, in other embodiments of the invention, each passive current check element of each first switching block may be replaced by a plurality of passive current check elements, e.g. a plurality of series-connected passive current check elements.

It is envisaged that, in other embodiments of the invention, each capacitor 34 may be replaced by another type of energy storage device that is capable of storing and releasing energy, e.g. a fuel cell or battery.

In each limb portion 18,20, the plurality of series-connected modules 28 defines a valve, and the operation of each module 28 in each valve is described as follows.

The capacitor 34 of the module 28 is selectively bypassed or inserted into the valve by changing the states of the IGBTs. This selectively directs current through the capacitor 34 or causes current to bypass the capacitor 34, so that the module 28 provides a zero or positive voltage.

The capacitor 34 of the module 28 is bypassed when the IGBTs are configured to form a short circuit that bypasses the capacitor 34. This causes current in the valve to pass through the short circuit and bypass the capacitor 34, and so the module 28 provides a zero voltage, i.e. the module 28 is configured in a bypassed mode.

The capacitor 34 of the module 28 is inserted into the valve when the IGBTs are configured to allow the current in the valve to flow into and out of the capacitor 34. The capacitor 34 then charges or discharges its stored energy so as to provide a non-zero voltage, i.e. the module 28 is configured in a non-bypassed mode.

In this manner the IGBTs are connected in parallel with the capacitor 34 in a half-bridge arrangement to define a 2-quadrant unipolar module 28 that can provide zero or positive voltage and can conduct current in two directions, and so each module 28 is capable of selectively providing a voltage source.

In other embodiments of the invention, it is envisaged that each module may be replaced by another type of module that includes at least one switching element and at least one energy storage device, whereby the or each switching element and the or each energy storage device in the or each module combines to selectively provide a voltage source.

It is possible to build up a combined voltage across the valve, which is higher than the voltage available from each of its individual modules 28 via the insertion of the capacitors 34 of multiple modules 28, each providing its own voltage, into the valve. In this manner switching of the IGBTs in each module 28 causes the valve to provide a stepped variable voltage source, which permits the generation of a voltage waveform across the valve using a step-wise approximation. As such each valve is capable of providing a wide range of complex voltage waveforms.

The voltage source converter 10 further includes a controller 38, and a switching control unit 50 configured to control switching of the switching elements 32 in each module 28 of each limb portion 18,20. More particularly, the controller 38 is configured to generate a respective valve voltage demand $V_T, V_B$ for each valve, and the switching control unit 50 controls switching of the switching elements 32 in each module 28 of each limb portion 18,20 in accordance with the respective valve voltage demand $V_T, V_B$ for each valve.

In use, the voltage source converter 10 is operable to transfer power between the AC and DC electrical networks 26,24 through switching of the switching elements 32 in each module 28 so as to selectively operate each limb portion 18,20 as a respective discrete controlled voltage source between the AC and DC terminals 22,12,14 over an operating cycle of the voltage source converter 10. Operating a limb portion as a discrete controlled voltage source between the corresponding AC and DC terminals 22,12,14 enables the limb portion 18,20 to be further operated to control the configuration of a voltage at the respective terminal 22,12,14. For example, the switching elements 32 in each module 28 can be switched to selectively provide a voltage source to "pull down" (subtract voltage steps from) a DC voltage at the respective DC terminal 12,14 to control the configuration of an AC voltage at the AC terminal 22. Such switching of the switching elements 32 in each module 28 of each limb portion 18,20 is carried out in accordance with the respective valve voltage demand $V_T, V_B$ for each valve.

In order for the voltage source converter 10 to exchange power with the AC and DC electrical networks 26,24 and thereby cause transfer of power between the AC and DC electrical networks 26,24, the controller 38 and switching control unit 50 control the operation of the voltage source converter 10 in accordance with AC and DC output voltage demands and alternating and direct current demands.

In use, the DC electrical network 24 is operated within or up to a predefined rated DC voltage Vdc and the AC electrical network 26 is operated within or up to a predefined rated AC voltage Vac. The AC and DC output voltage demands for the voltage source converter 10 respectively correspond to the AC voltage of the AC electrical network 26 and the DC voltage of the DC electrical network 24.

During the transfer of power between the AC and DC electrical networks 26,24, both AC and DC power flow through at least one capacitor 34 of at least one module 28 in the or each limb portion 18,20. This means that, in generating the respective valve voltage demand $V_T, V_B$ for each valve, the controller 38 must take into account the AC and DC output voltage demands and the alternating and direct current demands.

Figure 2:
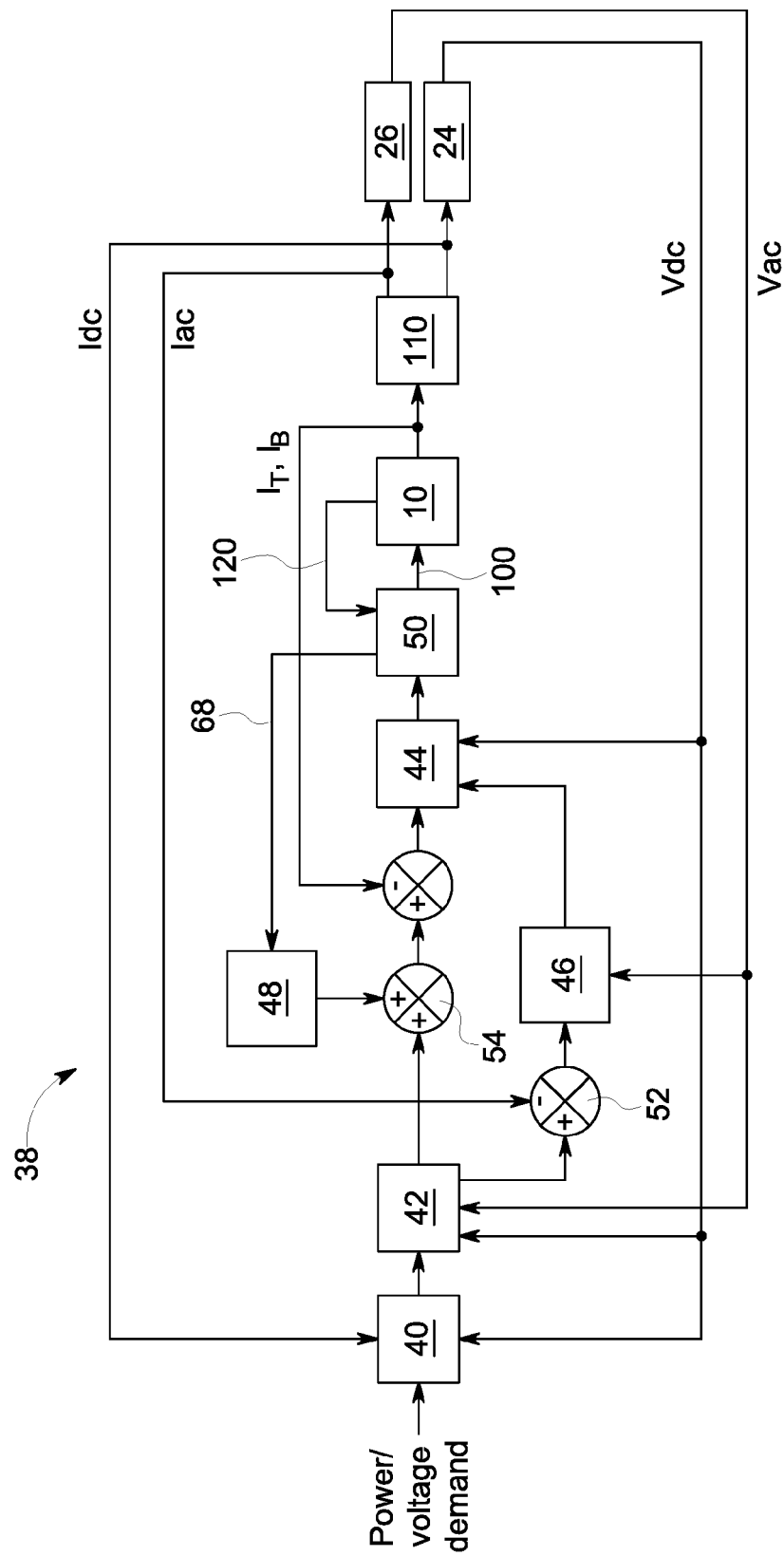

FIG. 2 shows, in schematic form, a layout of the controller 38. The configuration of the controller 38 is described as follows with reference to FIGS. 3 and 4.

Figure 3:
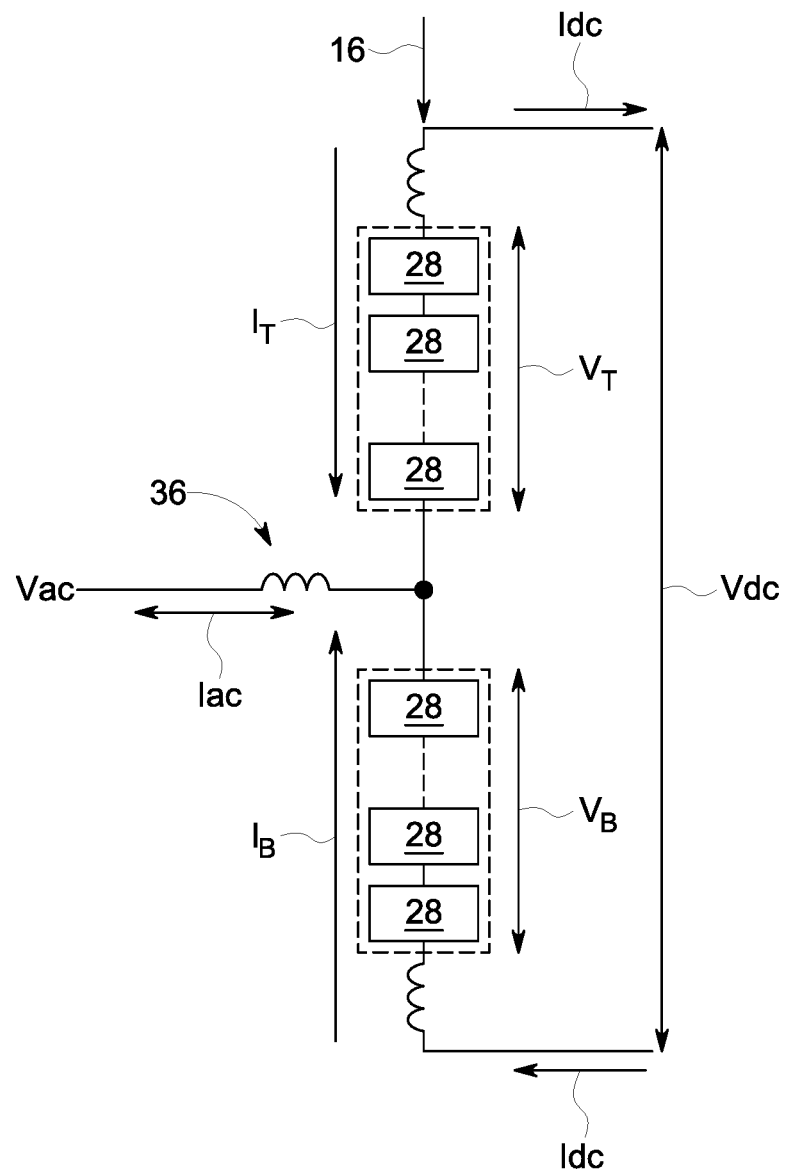
FIG. 3 illustrates, in schematic form, the voltages and currents in a converter limb of the voltage source converter of FIG. 1 during its operation to transfer power between AC and DC electrical networks.
Figure 4:
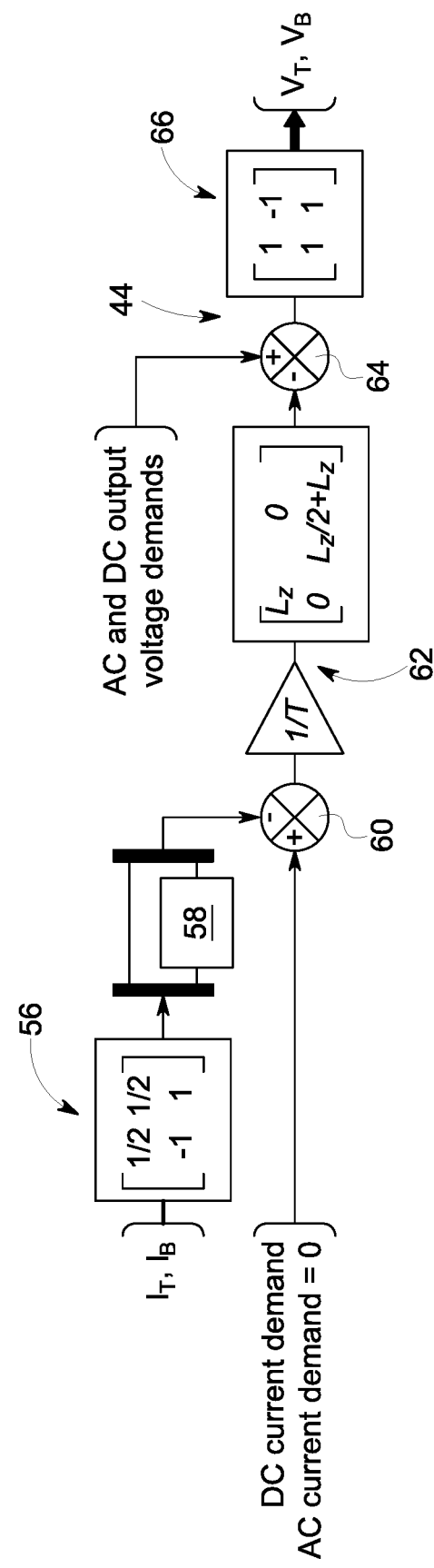
FIG. 4 shows, in schematic form, a layout of a valve voltage demand sub-controller forming part of the controller of FIG. 2.

FIG. 3 illustrates, in schematic form, the voltages and currents in a converter limb 16 of the voltage source converter 10 of FIG. 1 during its operation to transfer power between AC and DC electrical networks 26,24. FIG. 4 shows, in schematic form, the structure of a valve voltage demand sub-controller.

The controller 38 includes a DC outer loop control block 40, a power equating control block 42, a plurality of valve voltage demand sub-controllers 44, a vector control block 46, and a capacitor balancing control block 48. Each of the plurality of valve voltage demand sub-controllers 44 is associated with a respective one of the valves. For the purposes of simplicity, FIG. 2 shows only one of the plurality of valve voltage demand sub-controllers 44.

FIG. 2 further shows, in schematic form, a sum-difference control block that represents the combination of limb portion currents $I_T, I_B$ into alternating and direct currents Iac, Idc, whereby the alternating current Iac flows at the AC terminal 22 of the converter limb 16, and the direct current Idc flows at the first and second DC terminals 12,14 of the converter limb 16.

The controller 38 is configured to provide a power demand and the AC and DC output voltage demands to the DC outer loop control block 40. The DC outer loop control block 40 is configured to receive a measured direct current Idc and a measured DC voltage Vdc of the DC electrical network 24.

The DC outer loop control block 40 regulates the DC power flow of the voltage source converter 10 (or regulates the DC voltage Vdc across the first and second DC terminals 12,14), and provides information to the power equating control block 42, whereby the information consists of the power demand, the AC and DC output voltage demands, a direct current demand, the measured direct current Idc and DC voltage Vdc of the DC electrical network 24.

The power equating control block 42 generates a direct current demand based on the AC and DC output voltage demands and based on a balancing of an AC power exchanged between the voltage source converter 10 and the AC electrical network 26 and a DC power exchanged between the voltage source converter 10 and the DC electrical network 24. The power equating control block 42 scales the direct current demand received from the DC outer loop control block 40 to create an equivalent alternating current demand. The power equating control block 42 is configured to limit both alternating and direct current demands if excessive power is being demanded.

The controller 38 further includes alternating and direct current signal comparison blocks 52,54.

The alternating current signal comparison block 52, which in the embodiment shown is depicted as a difference junction, compares the alternating current demand (as provided by the power equating control block) with a measured alternating current Iac flowing between the voltage source converter 10 and the AC electrical network 26 so as to generate a modified alternating current demand, which is subsequently provided to the vector control block 46.

The direct current signal comparison block 54, which in the embodiment shown is depicted as a summing junction, modifies the direct current demand (as provided by the power equating control block) based on a capacitor balancing compensation signal from the capacitor balancing control block 48, and the direct current demand is subsequently provided to the valve voltage demand sub-controller 44.

Various ways of modifying the direct current demand based on the capacitor balancing compensation signal are described later on in the patent specification.

The vector control block 46 is configured to process the modified alternating current demand to provide the AC output voltage demand. The vector control block 46 is further configured to provide the AC output voltage demand to the valve voltage demand sub-controller 44.

For a given level of transfer of power between the voltage source converter 10 and the AC electrical network 26, the provision of the AC output voltage demand by the vector control block 46 enables control over an alternating current Iac flowing between the voltage source converter 10 and the AC electrical network 26. More particularly, the vector control block 46 controls the alternating current Iac by manipulating the AC voltage phase and magnitude. As such the vector control block 46 regulates the AC power flow of the voltage source converter 10.

Since the provision of the AC output voltage demand by the vector control block 46 already enables control over an alternating current Iac flowing between the voltage source converter 10 and the AC electrical network 26, the controller 38 is configured to provide a zero alternating current demand to the valve voltage demand sub-controller 44 to avoid duplication of control over the alternating current Iac flowing between the voltage source converter 10 and the AC electrical network 26 since, as mentioned earlier, the vector control block 46 already provides control over the alternating current Iac. Otherwise the provision of a non-zero alternating current demand to the valve voltage demand sub-controller 44 could interfere with the operation of the vector control block 46 to reliably control the alternating current flowing between the voltage source converter 10 and the AC electrical network 26.

The controller 38 further includes a first signal converter 56, a current modifier 58 and a first signal comparison block 60, as shown in FIG. 4.

The valve voltage demand sub-controller 44 includes a second signal converter 62, a second signal comparison block 64, and a third signal converter 66, as also shown in FIG. 4.

The voltage source converter 10 includes a current measurement device (not shown) configured to measure a respective limb portion current $I_T, I_B$ in each of the first and second limb portions 18,20.

The first signal converter 56 is configured to convert each measured limb portion current $I_T, I_B$ into alternating and direct current terms. More particularly, in the embodiment shown, converting each measured limb portion current $I_T, I_B$ into alternating and direct current terms involves multiplying the measured limb portion currents $I_T, I_B$ with the following matrix:

$$\begin{bmatrix} 1/2 & 1/2 \\ -1 & 1 \end{bmatrix}$$

The current modifier 58 is configured to modify the alternating current term using a filter to remove an AC fundamental current term so as to generate a modified alternating current term, while the direct current term is unmodified by the current modifier. In the embodiment shown, the filter is a low pass filter. It is envisaged that, in other embodiments of the invention, the filter may be replaced by a high-pass filter or a combination of low-pass and high-pass filters.

The first signal comparison block 60, which in the embodiment shown is depicted as a difference junction, is configured to compare the direct current term with the direct current demand (as provided to the valve voltage demand sub-controller 44) and to compare the modified alternating current term with the zero alternating current demand so as to generate alternating and direct current compensation signals. Due to the use of the zero alternating current demand, it is necessary to remove the AC fundamental current term from the alternating current term to avoid duplication of control over the alternating current Iac flowing between the voltage source converter 10 and the AC electrical network 26.

The second signal converter 62 is configured to convert the alternating and direct current compensation signals into AC and DC voltage terms. More particularly, in the embodiment shown, converting the alternating and direct current compensation signals into AC and DC voltage terms involves multiplying the alternating and direct current compensation signals with the following matrix:

$$\begin{bmatrix} L_L/T & 0 \\ 0 & (L_L/2 + L_T)/T \end{bmatrix}$$

Where $L_L$ is the reactance value of the valve in each limb portion 18,20, $L_T$ is the value of the corresponding series reactance 36 and T is the sample period for the control of the converter limb 16.

The second signal comparison block 64, which in the embodiment shown is depicted as a difference junction, is configured to compare the DC voltage term with the DC output voltage demand (as provided to the valve voltage demand sub-controller 44) and to compare the AC voltage term with the AC output voltage demand (as provided to the valve voltage demand sub-controller 44) so as to generate AC and DC voltage compensation signals.

The third signal converter 66 is configured to process the AC and DC voltage compensation signals using a sum and difference function so as to convert the AC and DC voltage compensation signals into the respective valve voltage demand $V_T, V_B$ for each valve. More particularly, in the embodiment shown, processing the AC and DC voltage compensation signals using a sum and difference function involves multiplying the AC and DC voltage compensation signals with the following matrix:

$$\begin{bmatrix} 1 & -1 \\ 1 & 1 \end{bmatrix}$$

In this manner the valve voltage demand sub-controller 44 is configured to generate the respective valve voltage demand $V_T, V_B$ for each valve.

The use of the respective limb portion current $I_T, I_B$ as feedback allows the valve voltage demand sub-controller 44 to function as a feedback deadbeat control and thereby enhances control over the operation of the voltage source converter 10 to transfer power between the AC and DC electrical networks 22,24 while having minimal effect on the bandwidths of the other cascaded components 40,42,46,48 of the controller 38 that are configured to provide the demands to the valve voltage demand sub-controller.

The respective valve voltage demand $V_T, V_B$ for each valve is provided to the switching control unit 50. The switching control unit 50 is configured to receive information 120 from the voltage source converter 10 about the voltage levels of the plurality of capacitors 34 in each valve. The switching control unit 50 sorts out the received information 120 into order by voltage level of the capacitor 34 of each module 28 at regular intervals. The switching control unit 50 then selects the modules 28 required to be in the non-bypassed mode in order to enable generation of a voltage across the valve to meet the valve voltage demand $V_T, V_B$.

Preferably the switching control unit 50 is configured to select the modules 28 required to be in the non-bypassed mode so as to enable balancing of the energy levels of the capacitors 34 of the plurality of modules 28 in each valve. In this case, the switching control unit 50 selects the modules 28 with the largest voltage levels to be in the non-bypassed mode for a direction of current flow that results in capacitor discharging, and selects the modules 28 with the smallest voltage levels to be in the non-bypassed mode for a direction of current flow that results in capacitor charging.

Thereafter, the switching control unit 50 generates a state demand 100 for each module 28, whereby each state demand 100 corresponds to a switching state for the respective module 28 that enables generation of a voltage across the valve to meet the valve voltage demand $V_T, V_B$. The possible switching states for each module 28 may be a bypassed mode (as set out earlier) or a non-bypassed mode (as set out earlier).

In respect of each limb portion 18,20, the switching control unit 50 is configured to control switching of the switching elements 32 of each module 28 in order to comply with the respective state demand 100 and thereby meet the respective valve voltage demand $V_T, V_B$. More particularly, as shown in FIGS. 1a and 1b, the switching control unit 50 provides the respective state demand 100 to local module electronics 138 associated with each module 28. The local module electronics 138 of each module 28 then controls switching of the switching elements 32 in the respective module 28 of each limb portion 18,20 in accordance with the respective state demand 100 (and therefore in accordance with the respective valve voltage demand $V_T, V_B$ for each valve) and thereby causes transfer of power between the AC and DC electrical networks 26,24.

The configuration of the controller 38 of FIG. 2 therefore permits generation of valve voltage demands $V_T, V_B$ that enables regulation of the direct current Idc flowing between the voltage source converter 10 and the DC electrical network 24, without inhibiting the operation of the vector control block 46 to reliably control the alternating current Iac flowing between the voltage source converter 10 and the AC electrical network 26. In addition, the configuration of the controller 38 enables the valve voltage demand sub-controller 44 to operate as a deadbeat control that has minimal effect on the bandwidths of the other cascaded components 40,42,46,48 of the controller 38 that are configured to provide the demands to the valve voltage sub-controller 44. This results in a more optimal and reliable controller 38 for controlling the voltage source converter 10 to transfer power between the AC and DC electrical networks 26,24.

During the operation of the voltage source converter 10 to transfer power between the AC and DC electrical networks 26,24, energy is transferred from one of the AC and DC electrical networks 26,24 to the other of the AC and DC electrical networks 26,24. Energy transferred from one of the AC and DC electrical networks 26,24 to the other of the AC and DC electrical networks 26,24 flows through the capacitor 34 of each module 28 that is controlled to selectively provide a voltage source during the operation of the voltage source converter 10 to transfer power between the AC and DC electrical networks 26,24. Such a flow of energy through the capacitor 34 of each module 28 could result in energy accumulation in (or energy loss from) at least one capacitor 34, thus resulting in deviation of the energy level of at least one capacitor 34 from a reference value.

Such a deviation is undesirable because, if too little energy is stored within a given capacitor 34 then the voltage the corresponding module 28 is able to generate is reduced, whereas if too much energy is stored in a given capacitor 34 then over-voltage problems may arise. The former would require the addition of a power supply to restore the energy level of the affected capacitor 34 to the reference value, while the latter would require an increase in voltage rating of one or more capacitors 34 to prevent the over-voltage problems, thus adding to the overall size, weight and cost of the voltage source converter 10.

The capacitor balancing control block 48 is configured to receive an average voltage level 68 of the plurality of capacitors 34 in each limb portion 18,20 from the switching control unit 50, and to process the received average voltage levels 68 to generate the capacitor balancing compensation signal. The capacitor balancing compensation signal may be configured in various ways to enable modification of the direct current demand from the power equating control block such that the direct current demand provided to the valve voltage demand sub-controller 44 is defined as follows.

The direct current demand provided to the valve voltage demand sub-controller 44 may be defined to enable maintenance of an energy level of at least one capacitor 34 at a predefined energy level or within a predefined energy range, when the switching control unit 50 controls switching of the switching elements 32 in each module 28 so as to generate a voltage across each valve in accordance with the respective valve voltage demand $V_T, V_B$.

Optionally the direct current demand provided to the valve voltage demand sub-controller 44 may be defined by introducing an alternating current demand into the direct current demand provided by the power equating block 42 in order to cause injection of an AC circulating current into the DC side of the voltage source converter 10, whereby the phase relationship between the injected alternating current and the AC voltage at the AC terminal 22 may vary. For example, the injected AC circulating current may be in phase or anti-phase with the AC voltage at the AC terminal 22. This enables balancing of an average energy level of the plurality of capacitors 34 in the first limb portion 18 with an average energy level of the plurality of capacitors 34 in the second limb portion 20, when the switching control unit 50 controls switching of the switching elements 32 in each module 28 so as to generate a voltage across each valve in accordance with the respective valve voltage demand $V_T, V_B$. In this manner an average energy level of the plurality of capacitors 34 in the first limb portion 18 can be equalised with an average energy level of the plurality of capacitors 34 in the second limb portion 20.

Further optionally the direct current demand provided to the valve voltage demand sub-controller 44 may be defined by inserting an offset current demand into the direct current demand from the power equating control block 42. This enables maintenance of a sum of average energy levels of the plurality of capacitors 34 in the first and second limb portions 18,20 at a predefined energy level or within a predefined energy range, when the switching control unit 50 controls switching of the switching elements 32 in each module 28 so as to generate a voltage across each valve in accordance with the respective valve voltage demand $V_T, V_B$. In this manner the average energy level of the plurality of capacitors 34 in the first and second limb portions 18,20 can be set to be equal to a desired operating point.

Defining the direct current demand provided to the valve voltage demand sub-controller 44 in any of the manners set out above permits regulation of the energy stored in a given capacitor 34, thereby obviating the abovementioned problems associated with a deviation of the energy level of at least one capacitor 34 from the reference value.

In addition such regulation of the energy stored in a given capacitor 34 allows the voltage of any particular capacitor 34 to be kept at an average value to enable use of the average value as feedback to control switching of the switching elements 32 of each module 28 and thereby simplify the control and improve the performance of the voltage source converter 10.

The configuration of the controller 38 of FIG. 2 therefore results in a more optimal and reliable controller 38 for regulating an energy level of at least one capacitor 34 of the voltage source converter 10 at a predefined energy level or within a predefined energy range.

In FIG. 1a, the voltage source converter 10 is connected to the AC electrical network 26 via a star-delta transformer that includes mutually coupled star-connected and delta-connected windings. The delta-connected winding prevents zero phase sequence DC and alternating current components from passing to the star-connected winding. This means that the zero phase sequence alternating current components become trapped in the closed loop formed by the delta-shaped winding and thus cannot enter the connected AC electrical network 26. However, the delta-connected winding provides a current path in which uncontrolled zero phase sequence alternating current components can circulate between the different phases (and therefore within the different converter limbs 16).

To restrict circulation of uncontrolled currents within the different converter limbs 16, the current modifier 58 is configured to modify the alternating current term using a filter to remove the AC fundamental current term so as to generate the modified AC term. This permits generation of valve voltage demands $V_T, V_B$ that enables restriction of the circulation of undesirable currents within the converter limbs 16 of the voltage source converter 10, together with regulation of the direct current Idc flowing between the voltage source converter 10 and the DC electrical network 24, without inhibiting the operation of the vector control block 38 to reliably control the alternating current Iac flowing between the voltage source converter 10 and the AC electrical network 26.

A model of the operation of the voltage source converter 10 of FIG. 1a was carried out to show the effect of tolerances on current transducers that are used to measure respective limb portion currents $I_T, I_B$ in each limb portion 18, 20, and to show the effect of a single phase fault on the operation of the voltage source converter 10.

The model includes measurements of the voltage and current of a secondary winding of a transformer connected to the AC terminals 22 of the voltage source converter 10. The model further includes a notch filter added to remove the power frequency signal and a second order low pass filter to remove any residual high frequency noise. For each test, the model was run for 3 seconds at full power to allow stabilisation of the modelled voltage source converter, and the results of the final second of the model are presented in each of FIGS. 5 to 10.

Figure 9:
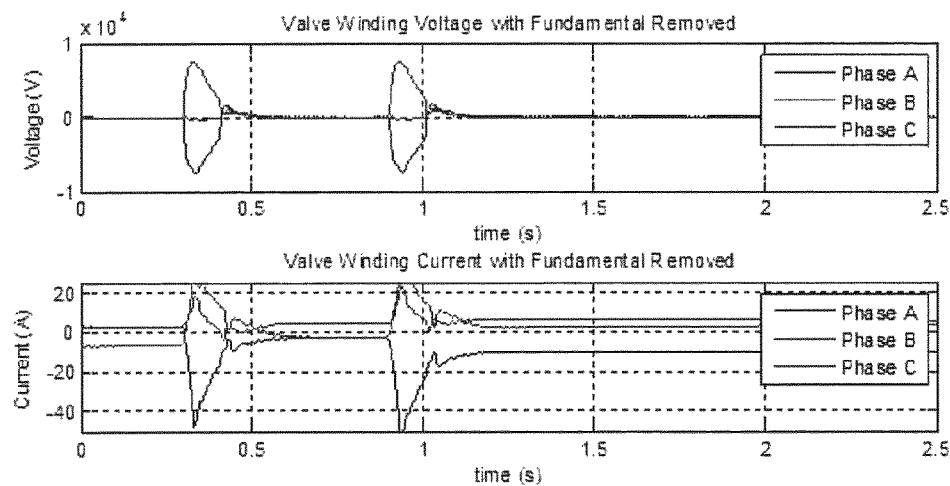
Figure 10:
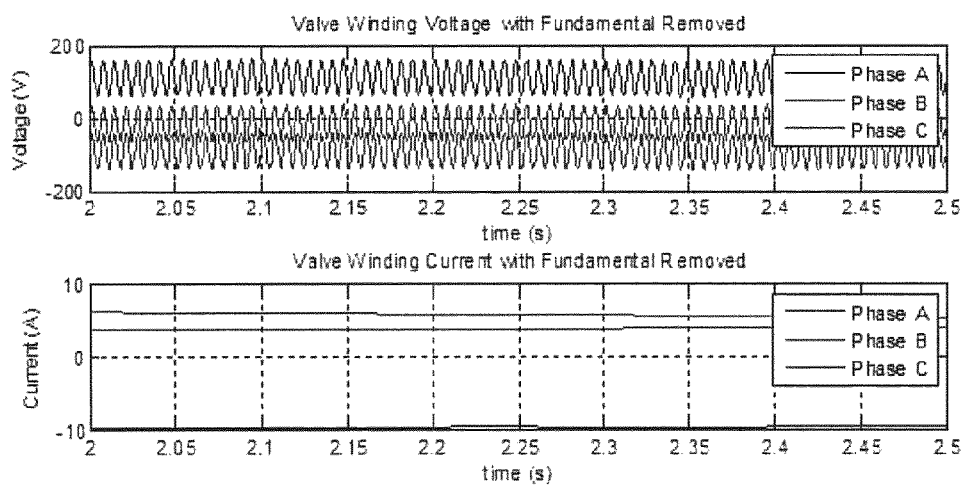

FIGS. 5 to 8 illustrates results of the model of the operation of the voltage source converter 10 of FIG. 1a when controlled by the controller 38 of FIG. 2. FIGS. 9 and 10 illustrates results of the model of the operation of the voltage source converter 10 of FIG. 1a when controlled by a conventional controller. The fundamental voltage and current values were removed from FIGS. 5 to 10, for illustration purposes, and so FIGS. 5 to 10 show $3^{rd}$ harmonic voltage and direct current values.

Figure 5:
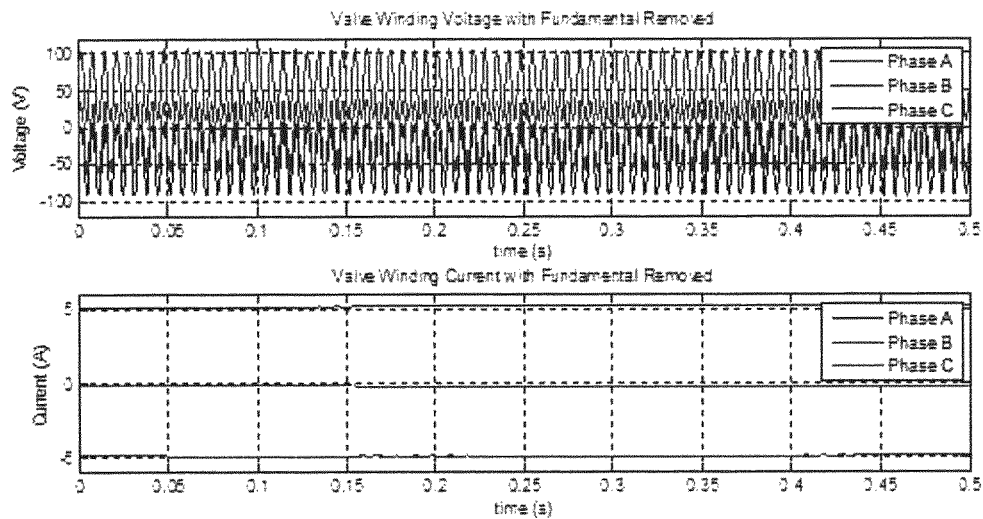
Figure 6:
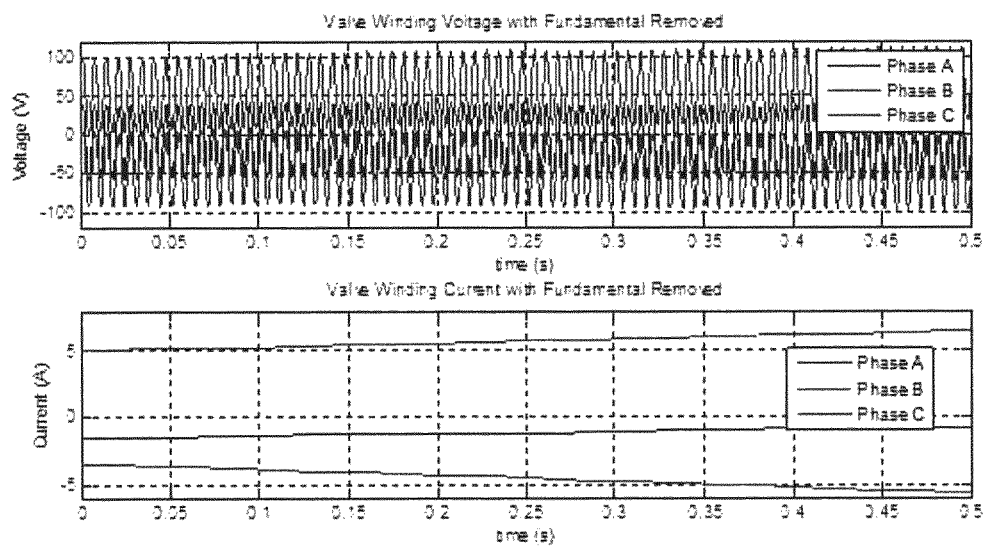
Figure 7:
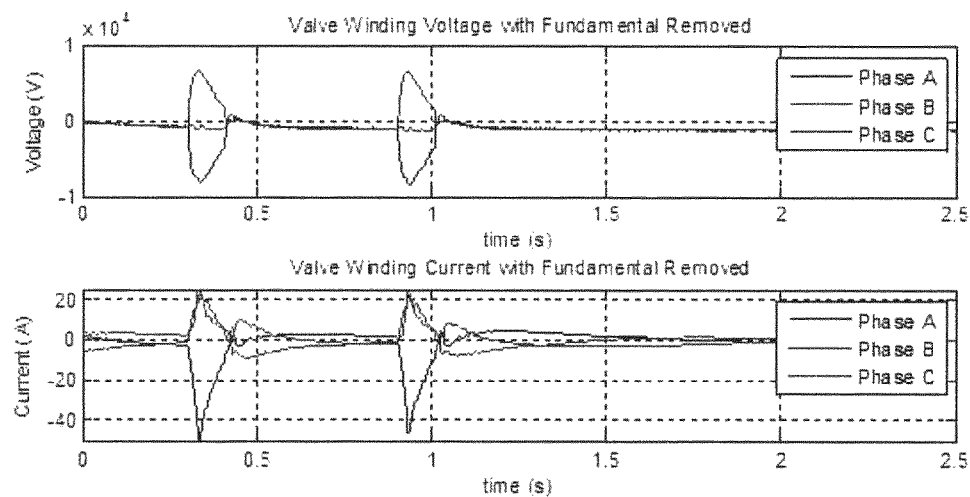
Figure 8:
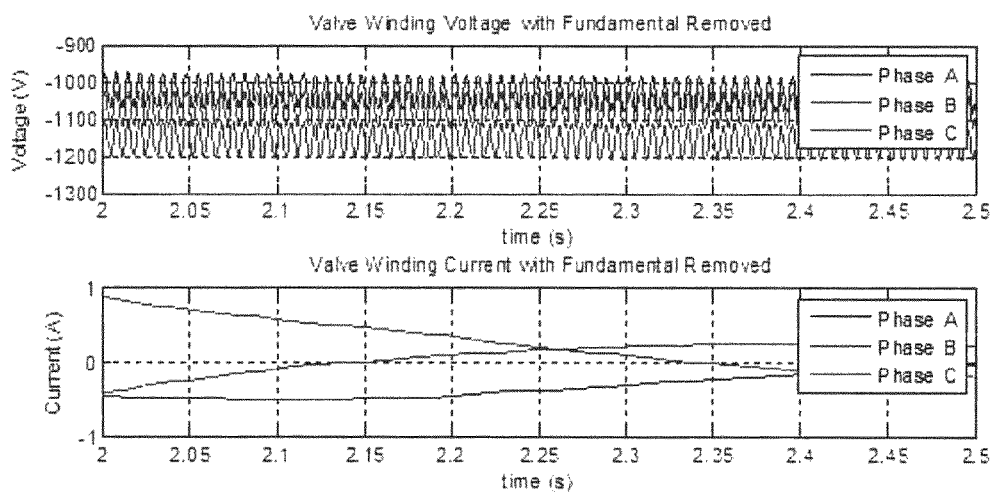

For each test shown in FIGS. 5 and 6:
a first current transducer has a tolerance of +0.5% and is associated with the first limb portion 18 connected to a first phase, Phase A, of the AC electrical network 26;
a second current transducer has a tolerance of −0.5% and is associated with the first limb portion 18 connected to a second phase, Phase B, of the AC electrical network 26;
a third current transducer has a tolerance of 0% and is associated with the first limb portion 18 connected to a third phase, Phase C, of the AC electrical network 26;
a fourth current transducer has a tolerance of −0.5% and is associated with the second limb portion 20 connected to the first phase, Phase A;
a fifth current transducer has a tolerance of +0.5% and is associated with the second limb portion 20 connected to the second phase, Phase B;
a sixth current transducer has a tolerance of 0% and is associated with the second limb portion 20 connected to the third phase, Phase C.

It can be seen from FIG. 5 that, when the voltage source converter 10 is controlled by the controller 38 of FIG. 2, a distinct difference in voltage between different phases results in a corresponding direct current flowing between Phases A and B, whereby the direct current is limited to a maximum magnitude of 5 A. On the other hand it can be seen from FIG. 6 that, when the voltage source converter 10 is controlled by a conventional controller, the voltages of the different phases are nominally the same, but the direct current is not limited to 5 A and will continue to rise with time until the transformer saturates.

For each test shown in FIGS. 7 to 10, a single-phase fault was applied at 0.3 seconds and at 0.9 seconds. Application of each single-phase fault results in a significant increase in the direct current in the secondary winding. It can be seen from FIGS. 7 and 8 that, when the voltage source converter 10 is controlled by the controller 38 of FIG. 2, the direct current returns towards its initial value prior to the application of each single-phase fault. On the other hand it can be seen from FIGS. 8 and 9 that, when the voltage source converter 10 is controlled by a conventional controller, the direct current does not return to its initial value prior to the application of each single-phase fault.

It can therefore be seen from FIGS. 5 to 10 that the configuration of the controller 38 to provide a zero alternating current demand to the valve voltage demand sub-controller 44 enables any unwanted, and potentially harmful, direct current in the current path between the voltage source converter 10 and the transformer to be driven to zero or to a safe, limited value, thus enhancing the reliability of the voltage source converter 10.

It is envisaged that, in other embodiments of the invention, the topology of the voltage source converter may vary depending on the requirements of the associated power application.

It is further envisaged that, in other embodiments of the invention, the number (i.e. one or more) of converter limbs in the voltage source converter may vary depending on the number of phases of the AC electrical network.

It is still further envisaged that, in other embodiments of the invention, each module may be configured to enable switching of the or each switching element in each module to selectively provide a voltage source to "push up" (add voltage steps to) a DC voltage at the respective DC terminal to control the configuration of an AC voltage at the AC terminal, in addition to or in place of switching of the or each switching element in each module to selectively provide a voltage source to "pull down" (subtract voltage steps from) a DC voltage at the respective DC terminal to control the configuration of an AC voltage at the AC terminal.

The invention claimed is:

1. A voltage source converter comprising:
at least one DC terminal for connection to a DC electrical network;
a converter limb operatively connected to the at least one DC terminal, the converter limb including at least one limb portion operatively connected to an AC terminal, the AC terminal being connectable to an AC electrical network, the or each limb portion including a valve, the or each valve including at least one module, the or each module including at least one switching element and at least one energy storage device, the or each switching element and the or each energy storage device in the or each module combining to selectively provide a voltage source;
a controller including a valve voltage demand sub-controller, the controller being configured to provide a zero alternating current demand, for an alternating current flowing between the voltage source converter and the AC electrical network, and a direct current demand, for a direct current flowing between the voltage source converter and the DC electrical network, to the valve voltage demand sub-controller, the controller being further configured to provide AC and DC output voltage demands to the valve voltage demand sub-controller, the valve voltage demand sub-controller being configured to process the alternating and direct current demands and the AC and DC output voltage demands so as to generate a or a respective valve voltage demand for the or each valve; and
a switching control unit configured to control switching of the or each switching element in the or each module so as to generate a voltage across the or each valve in accordance with the or the respective valve voltage demand and thereby cause transfer of power between the AC and DC electrical networks.

2. A voltage source converter according to claim 1 wherein the controller includes a vector control block configured to provide the AC output voltage demand.

3. A voltage source converter according to claim 1 wherein the at least one DC terminal includes first and second DC terminals, and the converter limb extends between the first and second DC terminals, the at least one limb portion including first and second limb portions separated by the AC terminal.

4. A voltage source converter according to claim 1 wherein the direct current demand is defined so that, when processed by the valve voltage demand sub-controller, the direct current demand enables maintenance of an energy level of at least one energy storage device at a predefined energy level or within a predefined energy range, when the switching control unit controls switching of the or each switching element in the or each module so as to generate a voltage across the or each valve in accordance with the or the respective valve voltage demand.

5. A voltage source converter according to claim 1 wherein the converter limb includes a plurality of limb portions, and the direct current demand is defined so that, when processed by the valve voltage demand sub-controller, the direct current demand enables balancing of:
    an energy level of the energy storage device in one limb portion with an energy level of the energy storage device in another limb portion; or
    an average energy level of a plurality of energy storage devices in one limb portion with an average energy level of a plurality of energy storage devices in another limb portion,
    when the switching control unit controls switching of the or each switching element in each module so as to generate a voltage across the or each valve in accordance with the or the respective valve voltage demand.

6. A voltage source converter according to claim 1 wherein the converter limb includes a plurality of limb portions, and the direct current demand is defined so that, when processed by the valve voltage demand sub-controller, the direct current demand enables maintenance of a sum of energy levels or average energy levels of a plurality of energy storage devices in a plurality of limb portions at a predefined energy level or within a predefined energy range, when the switching control unit controls switching of the or each switching element in each module so as to generate a voltage across the or each valve in accordance with the or the respective valve voltage demand.

7. A voltage source converter according to claim 1 wherein the voltage source converter includes a current measurement device configured to measure a or a respective limb portion current in the or each limb portion, the valve voltage demand sub-controller being further configured to process the or the respective limb portion current so as to generate a or a respective valve voltage demand for the or each valve.

8. A voltage source converter according to claim 1 wherein the controller includes:
    a first signal converter configured to convert a or a respective measured limb portion current into alternating and direct current terms;
    a current modifier configured to modify the alternating current term to remove an AC fundamental current term so as to generate a modified alternating current term; and
    a first signal comparison block configured to compare the direct current term with the direct current demand and to compare the modified alternating current term with the zero alternating current demand so as to generate alternating and direct current compensation signals, and wherein the valve voltage demand sub-controller includes:
    a second signal converter configured to convert the alternating and direct current compensation signals into AC and DC voltage terms;
    a second signal comparison block configured to compare the DC voltage term with the DC output voltage demand and to compare the AC voltage term with the AC output voltage demand so as to generate AC and DC voltage compensation signals; and
    a third signal converter configured to convert the AC and DC voltage compensation signals into a or a respective valve voltage demand for the or each valve.

9. A voltage source converter according to claim 8 wherein the current modifier is configured to restrict a circulating current from flowing within the converter limb.

10. A voltage source converter according to claim 8 wherein the current modifier includes at least one filter configured to modify the alternating current term.

11. A voltage source converter according to claim 10 wherein the or each filter is a low-pass filter or a high-pass filter.

12. A voltage source converter according to claim 8 wherein the third signal converter is configured to process the AC and DC voltage compensation signals using a sum and difference function so as to convert the AC and DC voltage compensation signals into a or a respective valve voltage demand for the or each valve.

13. A method of controlling a voltage source converter, the voltage source converter comprising at least one DC terminal for connection to a DC electrical network, the voltage source converter further including a converter limb operatively connected to the at least one DC terminal, the converter limb including at least one limb portion operatively connected to an AC terminal, the AC terminal being connectable to an AC electrical network, the or each limb portion including a valve, the or each valve including at least one module, the or each module including at least one switching element and at least one energy storage device, the or each switching element and the or each energy storage device in the or each module combining to selectively provide a voltage source, the method comprising the steps of:
    (a) providing a zero alternating current demand, for an alternating current flowing between the voltage source converter and the AC electrical network, and a direct current demand, for a direct current flowing between the voltage source converter and the DC electrical network;
    (b) providing AC and DC output voltage demands;
    (c) processing the alternating and direct current demands and the AC and DC output voltage demands so as to generate a or a respective valve voltage demand for the or each valve;
    (d) switching the or each switching element in the or each module so as to generate a voltage across the or each valve in accordance with the or the respective valve voltage demand and thereby cause transfer of power between the AC and DC electrical networks.

* * * * *